US012647743B2

(12) United States Patent
Wang et al.

(10) Patent No.: US 12,647,743 B2
(45) Date of Patent: Jun. 2, 2026

(54) MULTI-CHANNEL AUDIO SYSTEM

(71) Applicant: Hangzhou Lifesmart Technology Co., Ltd., Hangzhou (CN)

(72) Inventors: Jianhua Wang, Hangzhou (CN); Dongyue Wu, Hangzhou (CN)

(73) Assignee: HANGZHOU LIFESMART TECHNOLOGY CO., LTD., Hangzhou (CN)

( * ) Notice: Subject to any disclaimer, the term of this patent is extended or adjusted under 35 U.S.C. 154(b) by 135 days.

(21) Appl. No.: 18/897,310

(22) Filed: Sep. 26, 2024

(65) Prior Publication Data

US 2026/0046579 A1 Feb. 12, 2026

(30) Foreign Application Priority Data

Aug. 12, 2024 (CN) ......................... 202411103893.2

(51) Int. Cl.
*H04S 5/00* (2006.01)

(52) U.S. Cl.
CPC ...................................... *H04S 5/00* (2013.01)

(58) Field of Classification Search
CPC .. H04S 5/00; H04S 3/00; H04R 5/033; H04R 5/02; H04R 2205/024
See application file for complete search history.

(56) References Cited

U.S. PATENT DOCUMENTS

| | | | | |
|---|---|---|---|---|
| 8,442,244 B1 * | 5/2013 | Long, Jr. | H04R 5/027 | 381/26 |
| 2013/0108057 A1 * | 5/2013 | Yuyama | H04S 5/005 | 381/17 |
| 2019/0297447 A1 * | 9/2019 | Seldess | H04S 3/008 | |

* cited by examiner

*Primary Examiner* — Yosef K Laekemariam
(74) *Attorney, Agent, or Firm* — Christensen O'Connor Johnson Kindness PLLC

(57) ABSTRACT

The present application relates to the technical field of audio apparatuses and discloses a multi-channel audio system. The system includes a left centered-channel speaker, a left front channel speaker, a left channel speaker, a left rear channel speaker, a right centered-channel speaker, a right front channel speaker, a right channel speaker, a right rear channel speaker, a overhead channel module, a woofer, an audio apparatus base, and a mounting bracket; the left centered-channel speaker, the left front channel speaker, the left channel speaker, the left rear channel speaker, the right centered-channel speaker, the right front channel speaker, the right channel speaker, the right rear channel speaker, and the woofer are built in the audio apparatus base; the overhead channel module is located above the audio apparatus base and is connected to an audio socket of the audio apparatus base through an audio plug; and the audio apparatus base is mounted on the mounting bracket through a mounting plate. The present application creates a stereo surround sound environment by covering the speakers in multiple directions, thereby improving a stereo surround effect and user experience.

8 Claims, 9 Drawing Sheets

MULTI-CHANNEL AUDIO SYSTEM

TECHNICAL FIELD

The present application relates to the technical field of audio apparatuses, in particular to a multi-channel audio system.

BACKGROUND

With the development of audio and video entertainment and e-sports, both video games and the audio and video entertainment have a rich orientation sense of sound and sound details of different frequencies, thereby requiring to achieve stereo of a multi-channel surround effect through an audio apparatus when a user participates in the video games and watches images.

Currently, it is common for the user to wear headphones that simulate a stereophonic effect, and the headphones simulate a virtual multi-channel sound effect through software and algorithms. However, because each channel of the headphones is emitted by a speaker, due to sound directivity, it is very difficult to completely cover an annular area. Especially due to the lack of a overhead channel sound area, it is impossible to simulate the stereo surround sound effect of different sound areas in all directions, resulting in a poor stereo surround sound effect. Besides, wearing the headphones for a long period of time also affects the comfort of the user, and consequently the user experience is poor.

SUMMARY

For this purpose, the present application provides a multi-channel audio system so as to solve the problems of a poor stereo surround sound effect and poor user experience.

The present application provides a multi-channel audio system, where the system includes a left centered-channel speaker, a left front channel speaker, a left channel speaker, a left rear channel speaker, a right centered-channel speaker, a right front channel speaker, a right channel speaker, a right rear channel speaker, a overhead channel module, a woofer, an audio apparatus base, and a mounting bracket, the overhead channel module includes an audio plug, the audio apparatus base includes an audio socket, and the mounting bracket includes a mounting plate;

- the left centered-channel speaker, the left front channel speaker, the left channel speaker, the left rear channel speaker, the right centered-channel speaker, the right front channel speaker, the right channel speaker, the right rear channel speaker, and the woofer are all built in the audio apparatus base;
- the overhead channel module is located above the audio apparatus base and is connected to the audio socket of the audio apparatus base through the audio plug; and
- the audio apparatus base is mounted on the mounting bracket through the mounting plate.

The multi-channel audio system provided by embodiments of the present application creates a realistic stereo surround sound environment by covering the speakers in multiple directions, and the audio plug of the overhead channel module is connected to the audio apparatus base, thereby ensuring the stability of signal transmission. Meanwhile, due to combined design of the audio apparatus base and the mounting bracket, flexible adjustment can be performed according to an actual environment. Compared with the related art in which a user wears headphones that simulate a stereophonic effect, a stereo surround effect and user experience are improved.

In one optional embodiment, the overhead channel module further includes a left front overhead channel speaker, a left rear overhead channel speaker, a right front overhead channel speaker, and a right rear overhead channel speaker, and the left front overhead channel speaker, the left rear overhead channel speaker, the right front overhead channel speaker, and the right rear overhead channel speaker are all built in the overhead channel module.

The multi-channel audio system provided by the embodiments of the present application, by arranging the four overhead channel speakers above the audio apparatus base, not only extends a vertical dimension of channels, but also provides a better sense of layers for an overall stereo surround effect, thereby being able to create an all-around three-dimensional audio space for the user, which enhances the sense of realism and the degree of immersion of the user, and improves the user experience.

In one optional embodiment, the overhead channel module is detachable, and the left front overhead channel speaker, the left rear overhead channel speaker, the right front overhead channel speaker, and the right rear overhead channel speaker in the overhead channel module are all detachable.

The multi-channel audio system provided by the embodiments of the present application can achieve a personalized sound field layout through detachable design of the four overhead channel speakers, and at the same time enhances the flexibility of the audio system.

In one optional embodiment, when the head of the user is located at a center position of the audio apparatus base, the left centered-channel speaker is located in a direction range of tilting to the left by 15 degrees to 35 degrees relative to a due front direction from the left ear of the user, with a distance between the left centered-channel speaker and the left ear of the user being in a range of 270 mm to 300 mm;

- the left front channel speaker is located in a direction range of tilting to the left by 40 degrees to 60 degrees relative to the due front direction from the left ear of the user, with a distance between the left front channel speaker and the left ear of the user being in a range of 220 mm to 240 mm;
- the left front overhead channel speaker is located in a direction range of tilting to the left by 30 degrees to 60 degrees relative to the due front direction from the left ear of the user, with a distance between the left front overhead channel speaker and the left ear of the user being in a range of 240 mm to 300 mm;
- the left channel speaker is located in a direction range of between tilting forwards by 15 degrees and tilting backwards by 15 degrees relative to a due left direction from the left ear of the user, with a distance between the left channel speaker and the left ear of the user being in a range of 150 mm to 170 mm;
- the left rear overhead channel speaker is located in a direction range of tilting to the left by 30 degrees to 60 degrees relative to a due backward direction from the left ear of the user, with a distance between the left rear overhead channel speaker and the left ear of the user being in a range of 240 mm to 300 mm;
- the left rear channel speaker is located in a direction range of tilting to the left by 20 degrees to 40 degrees relative to the due backward direction from the left ear of the user, with a distance between the left rear channel speaker and the left ear of the user being in a range of 180 mm to 220 mm; and the woofer is located in a direction range of tilting to the right by 20 degrees to 40 degrees relative to the due backward direction from the left ear of the user, with a distance between the woofer and the left ear of the user being in a range of 280 mm to 320 mm.

The multi-channel audio system provided by the embodiments of the present application is capable of realizing a good stereo surround effect by precisely arranging the speakers of different channels in a specific angle range and distance range to form a stereo surround sound speaker system, thereby improving the user experience.

In one optional embodiment, the left centered-channel speaker and the right centered-channel speaker, the left front channel speaker and the right front channel speaker, the left front overhead channel speaker and the right front overhead channel speaker, the left channel speaker and the right channel speaker, the left rear overhead channel speaker and the right rear overhead channel speaker, and the left rear channel speaker and the right rear channel speaker are symmetrically distributed relative to an axis of symmetry of the acoustic apparatus base.

According to the multi-channel audio system provided by the embodiments of the present application, a perfect audio system is constructed through symmetrical design of a plurality of channels, which further improves the stereo surround effect.

In one optional embodiment, the mounting bracket includes a seat mounting bracket, a floor mounting bracket, and a wall mounting bracket.

According to the multi-channel audio system provided by the embodiments of the present application, the multi-channel audio system can adapt to a wide range of different environments through specific categorization of the mounting bracket, which improves the flexibility of the system, meets the usage needs of the user under different conditions, and improves the user experience.

In one optional embodiment, when the audio apparatus base is mounted on the seat mounting bracket, a mounting angle of the audio apparatus base is within an angle range between 60 degrees upward relative to a horizontal direction and 20 degrees downward relative to the horizontal direction;

when the audio apparatus base is mounted on the floor mounting bracket, a mounting angle of the audio apparatus base is within an angle range between 60 degrees upward relative to the horizontal direction and 90 degrees downward relative to the horizontal direction, and a vertical height of the floor mounting bracket from the ground is in a height range of 1 meter to 1.9 meters; and when the audio apparatus base is mounted on the wall mounting bracket, a mounting angle of the audio apparatus base is within an angle range between 60 degrees upward relative to the horizontal direction and 90 degrees downward relative to the horizontal direction, and a vertical height of the wall mounting bracket from the ground is in a height range of 1.3 meters to 1.9 meters.

The multi-channel audio system provided by the embodiments of the present application is capable of being flexibly adjusted within a specified range to adapt to different usage needs by specifying the mounting angle of the audio apparatus base and the mounting height of the mounting bracket when different mounting brackets are adopted, thereby being capable of improving the user experience.

In one optional embodiment, the audio apparatus base further includes a centered-channel forward-sound-guide output hole, a connection mode switching button, a power button, a volume increase button, and a volume decrease button.

According to the multi-channel audio system provided by the embodiments of the present application, through special design of the centered-channel forward-sound-guide output hole, the left and right front speakers can guide a position of sound of a centered-channel to the right front, so as to achieve the effect of the centered-channel right in the front, and through other design of the audio apparatus base, a variety of needs are satisfied, and practicability of the multi-channel audio system is improved.

DESCRIPTION OF THE DRAWINGS

To describe the technical solutions in embodiments of the present application or the prior art more clearly, the following briefly describes the accompanying drawings required for describing the embodiments or the prior art. Apparently, the accompanying drawings in the following description show only some embodiments of the present application, and a person of ordinary skill in the art may still derive other accompanying drawings from the accompanying drawings without creative efforts.

DETAILED DESCRIPTION

To make the objectives, technical solutions, and advantages of embodiments of the present application clearer, the following clearly and completely describes the technical solutions in the embodiments of the present application with reference to drawings in the embodiments of the present application. Apparently, the described embodiments are some rather than all of the embodiments of the present application. All other embodiments obtained by those skilled in the art based on the embodiments in the present application without creative efforts shall fall within the protection scope of the present application.

An embodiment of the present application provides a multi-channel audio system, solving the problems that in the related art, a user wears headphones that simulate a stereophonic effect, since it is impossible for the headphones to simulate the stereo surround sound effect of different sound areas in all directions, resulting in a poor stereo surround sound effect, and wearing the headphones for a long period of time also affects the comfort of the user, and consequently the user experience is poor. The embodiment of the present application creates a realistic stereo surround sound environment by covering speakers in multiple directions, thereby improving a stereo surround effect and user experience.

Figure 1:
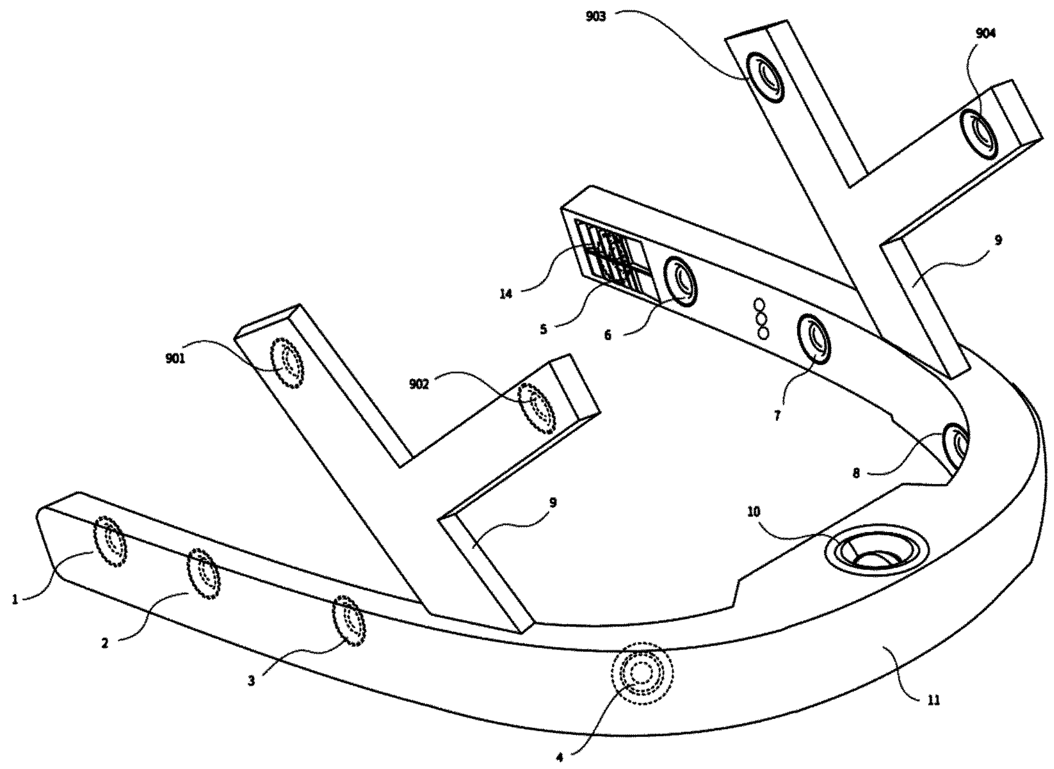
FIG. 1 is a schematic view of a multi-channel audio system according to an embodiment of the present application.

The embodiment of the present application provides a multi-channel audio system, as shown in FIG. 1, the system includes a left centered-channel speaker 1, a left front channel speaker 2, a left channel speaker 3, a left rear channel speaker 4, a right centered-channel speaker 5, a right front channel speaker 6, a right channel speaker 7, a right rear channel speaker 8, a overhead channel module 9, a woofer 10, an audio apparatus base 11, and a mounting bracket (not shown in FIG. 1), the overhead channel module 9 includes an audio plug (not shown in FIG. 1), the audio apparatus base 11 includes an audio socket (not shown in FIG. 1), and the mounting bracket includes a mounting plate (not shown in FIG. 1); the left centered-channel speaker 1, the left front channel speaker 2, the left channel speaker 3, the left rear channel speaker 4, the right centered-channel speaker 5, the right front channel speaker 6, the right channel speaker 7, the right rear channel speaker 8, and the woofer 10 are all built in the audio apparatus base 11; the overhead channel module 9 is located above the audio apparatus base 11 and is connected to the audio socket of the audio apparatus base 11 through the audio plug; and the audio apparatus base 11 is mounted on the mounting bracket through the mounting plate.

Specifically, the acoustic apparatus base 11 is in a curved shape and capable of forming the stereo surround effect in a near field of the human ear through a plurality of built-in speakers, and further forms an all-around sound field layout through the overhead channel module 9, which improves the stereo surround effect. The audio plug used by the overhead channel module 9 is located at a bottom of the overhead channel module 9, and the audio plug is selected to be 6.35 mm, and is connected to the audio socket of the audio apparatus base 11 to realize signal transmission between the overhead channel module 9 and the audio apparatus base 11. The realistic stereo surround sound environment is created by covering the speakers in multiple directions, and the audio plug of the overhead channel module 9 is connected to the audio apparatus base 11. Compared with the related art in which a user wears headphones that simulate a stereophonic effect, the stereo surround effect and user experience are improved.

In some optional embodiments, as shown in FIG. 1, the overhead channel module 9 further includes a left front overhead channel speaker 901, a left rear overhead channel speaker 902, a right front overhead channel speaker 903, and a right rear overhead channel speaker 904, and the left front overhead channel speaker 901, the left rear overhead channel speaker 902, the right front overhead channel speaker 903, and the right rear overhead channel speaker 904 are all built in the overhead channel module 9.

Specifically, by arranging the four overhead channel speakers above the audio apparatus base 11, not only a vertical dimension of the channel is extended, and but also a better sense of layers is provided for an overall stereo surround effect, and therefor it is able to create an all-around three-dimensional audio space for the user, which enhances the sense of realism and the degree of immersion of the user, and improves the user experience.

In some optional embodiments, the overhead channel module 9 is detachable, and the left front overhead channel speaker 901, the left rear overhead channel speaker 902, the right front overhead channel speaker 903, and the right rear overhead channel speaker 904 in the overhead channel module 9 are all detachable.

Figure 2:
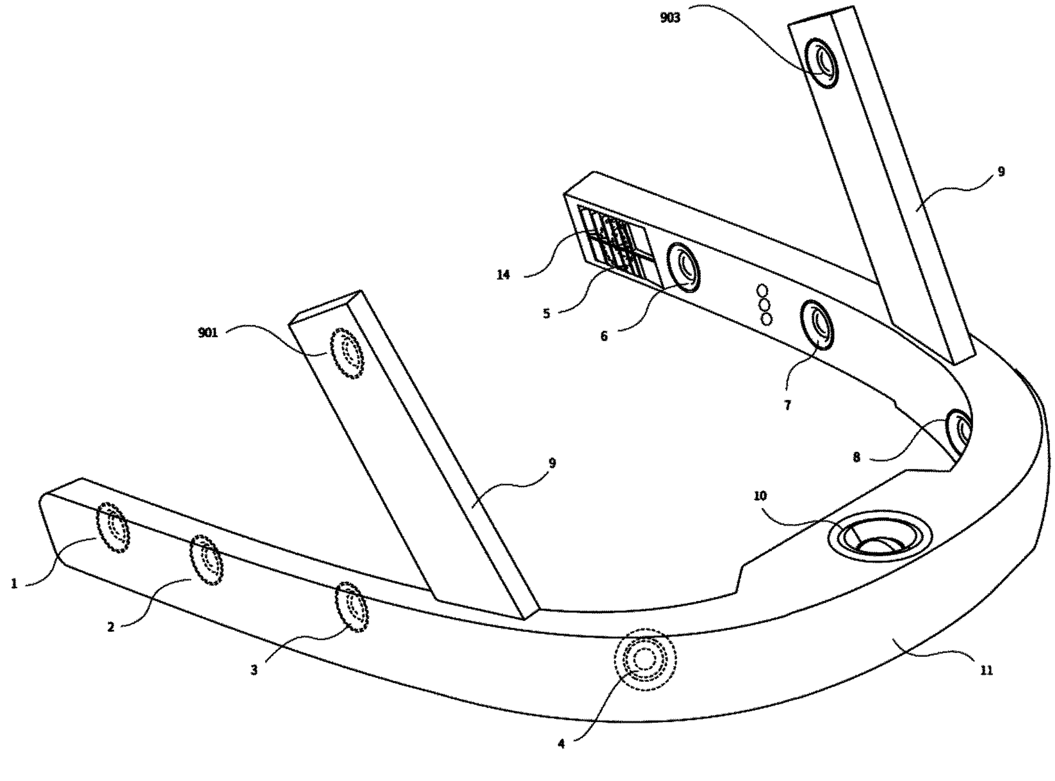
FIG. 2 is a schematic view of a multi-channel audio system using a 7.1.2 channel layout according to an embodiment of the present application.
Figure 3:
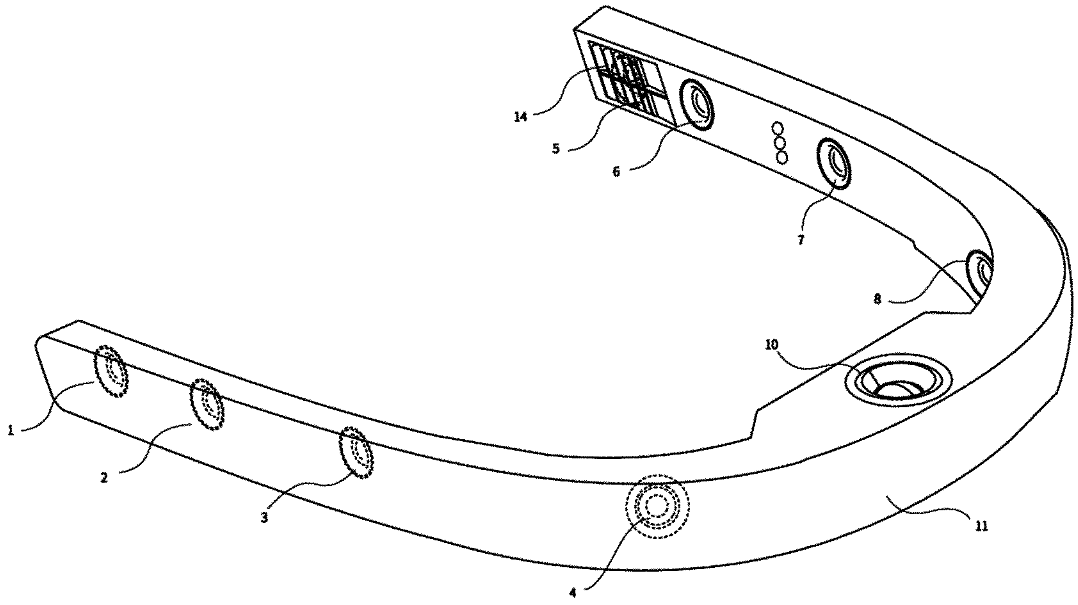
FIG. 3 is a schematic view of a multi-channel audio system using a 7.1 channel layout according to an embodiment of the present application.
Figure 4:
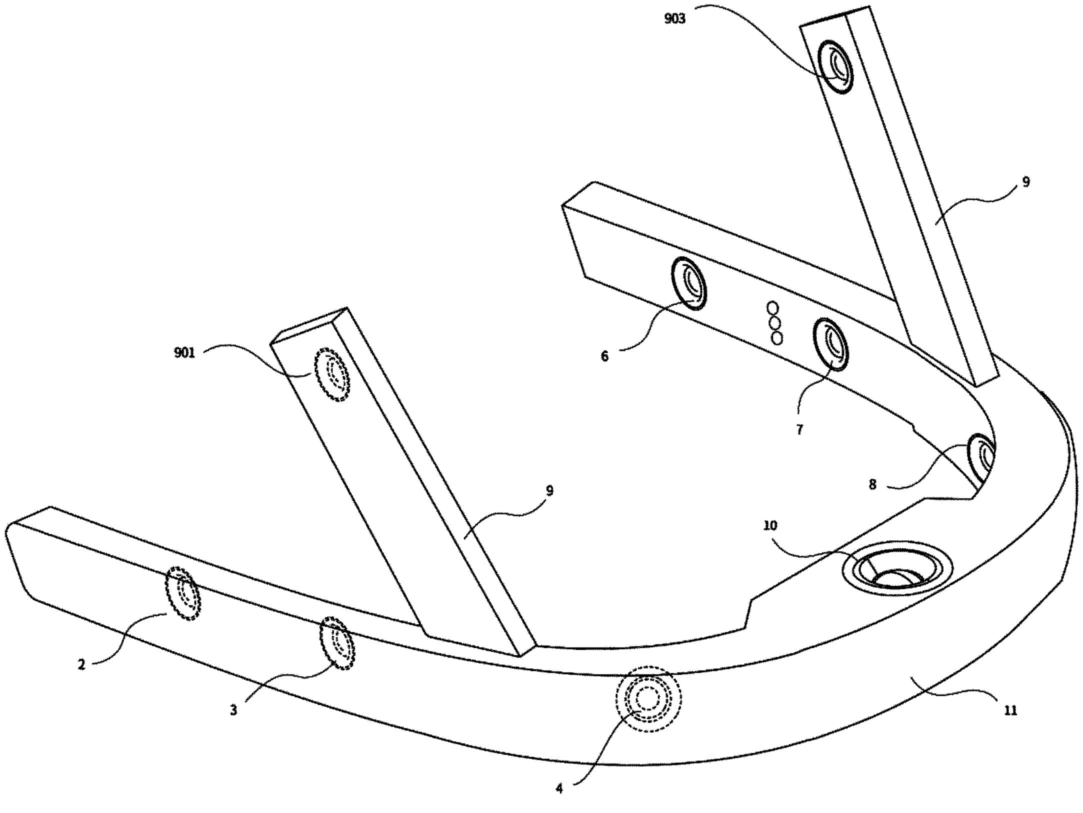
FIG. 4 is a schematic view of a multi-channel audio system using a 6.1.2 channel layout according to an embodiment of the present application.
Figure 5:
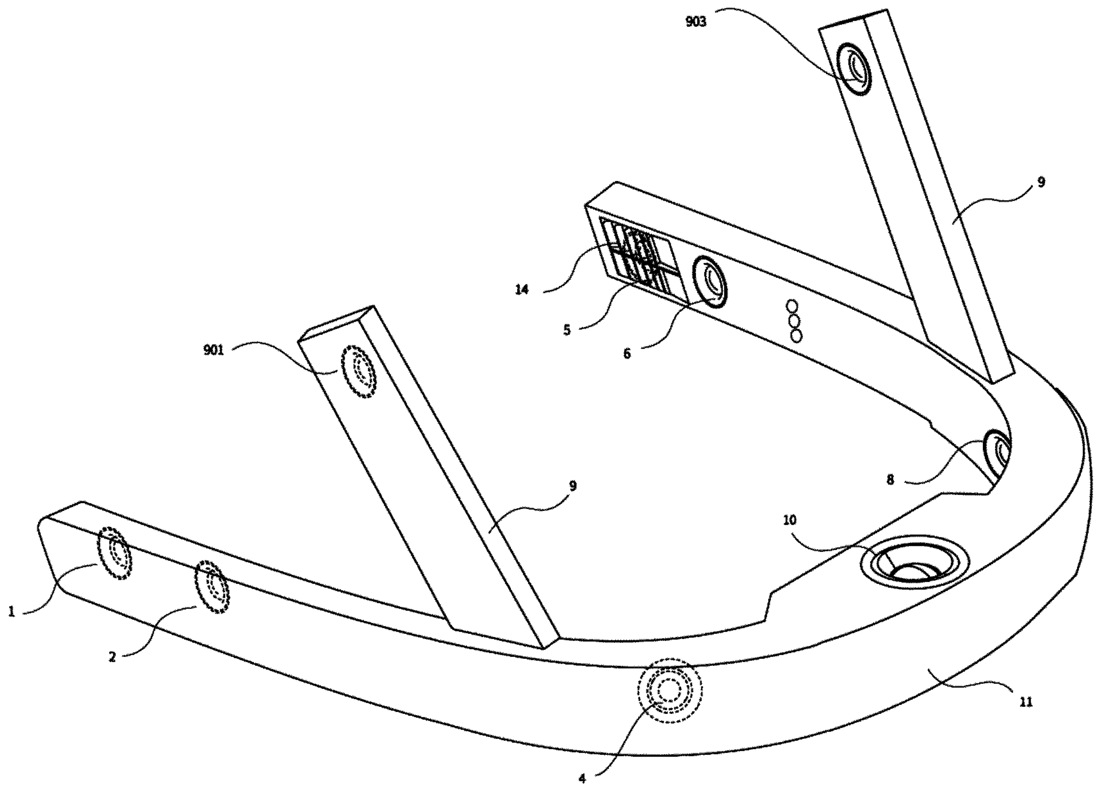
FIG. 5 is a schematic view of a multi-channel audio system using a 5.1.2 channel layout according to an embodiment of the present application.
Figure 6:
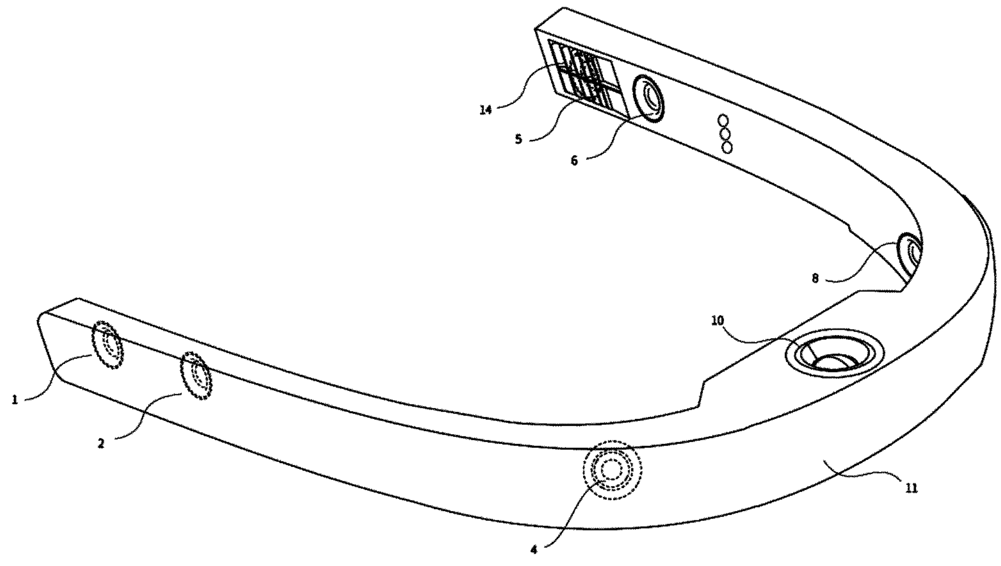
FIG. 6 is a schematic view of a multi-channel audio system using a 5.1 channel layout according to an embodiment of the present application.

Specifically, taking a 7.1.4 channel layout, a 7.1.2 channel layout, a 7.1 channel layout, a 6.1.2 channel layout, a 5.1.2 channel layout and a 5.1 channel layout as examples for illustration, it is also possible to detach the overhead channel module 9 according to actual needs, and combine and configure the plurality of speakers in the audio apparatus base 11 to realize personalized adjustment and obtain a personalized channel layout. The multi-channel audio system as shown in FIG. 1 uses the 7.1.4 channel layout, the 7.1.4 channel layout includes the left centered-channel speaker 1, the left front channel speaker 2, the left channel speaker 3, the left rear channel speaker 4, the right centered-channel speaker 5, the right front channel speaker 6, the right channel speaker 7, the right rear channel speaker 8, the woofer 10, and the four overhead channel speakers. FIG. 2 is a schematic view of a multi-channel audio system using the 7.1.2 channel layout according to an embodiment of the present application, as shown in FIG. 2, the left rear overhead channel speaker 902 and the right rear overhead channel speaker 904 are removed on the basis of the 7.1.4 channel layout to obtain the 7.1.2 channel layout. FIG. 3 is a schematic view of a multi-channel audio system using the 7.1 channel layout according to an embodiment of the present application, as shown in FIG. 3, the overhead channel module 9 is removed on the basis of the 7.1.4 channel layout to obtain the 7.1 channel layout. FIG. 4 is a schematic view of a multi-channel audio system using the 6.1.2 channel layout according to an embodiment of the present application, as shown in FIG. 4, the left rear overhead channel speaker 902 and the right rear overhead channel speaker 904 are removed on the basis of the 7.1.4 channel layout and the left centered-channel speaker 1 and the right centered-channel speaker 5 are closed to obtain the 6.1.2 channel layout. FIG. 5 is a schematic view of a multi-channel audio system using the 5.1.2 channel layout according to an embodiment of the present application, as shown in FIG. 5, the left rear overhead channel speaker 902 and the right rear overhead channel speaker 904 are removed on the basis of the 7.1.4 channel layout and the left channel speaker 3 and the right channel speaker 7 are closed to obtain the 5.1.2 channel layout. FIG. 6 is a schematic view of a multi-channel audio system using the 5.1 channel layout according to an embodiment of the present application, as shown in FIG. 6, the overhead channel module 9 is removed on the basis of the 7.1.4 channel layout and the left channel speaker 3 and the right channel speaker 7 are closed to obtain the 5.1 channel layout. It needs to be noted that each audio apparatus base 11 in FIG. 1 to FIG. 6 includes nine speakers, namely, the left centered-channel speaker 1, the left front channel speaker 2, the left channel speaker 3, the left rear channel speaker 4, the right centered-channel speaker 5, the right front channel speaker 6, the right channel speaker 7, the right rear channel speaker 8, and the woofer 10, different combinations and configuration are achieved by opening and closing a plurality of speakers in different channel layouts, the closed speaker is not shown in the drawings, but is still arranged in the acoustic apparatus base 11.

In some optional embodiments, when the head of the user is located at a center position of the audio apparatus base 11, the left centered-channel speaker 1 is located in a direction range of tilting to the left by 15 degrees to 35 degrees relative to a due front direction from the left ear of the user, with a distance between the left centered-channel speaker and the left ear of the user being in a range of 270 mm to 300 mm; the left front channel speaker 2 is located in a direction range of tilting to the left by 40 degrees to 60 degrees relative to the due front direction from the left ear of the user, with a distance between the left front channel speaker and the left ear of the user being in a range of 220 mm to 240 mm; the left front overhead channel speaker 901 is located in a direction range of tilting to the left by 30 degrees to 60 degrees relative to the due front direction from the left ear of the user, with a distance between the left front overhead channel speaker and the left ear of the user being in a range of 240 mm to 300 mm; the left channel speaker 3 is located in a direction range of between tilting forwards by 15 degrees and tilting backwards by 15 degrees relative to a due left direction from the left ear of the user, with a distance between the left channel speaker and the left ear of the user being in a range of 150 mm to 170 mm; the left rear overhead channel speaker 902 is located in a direction range of tilting to the left by 30 degrees to 60 degrees relative to a due backward direction from the left ear of the user, with a distance between the left rear overhead channel speaker and the left ear of the user being in a range of 240 mm to 300 mm; the left rear channel speaker 4 is located in a direction range of tilting to the left by 20 degrees to 40 degrees relative to the due backward direction from the left ear of the user, with a distance between the left rear channel speaker and the left ear of the user being in a range of 180 mm to 220 mm; and the woofer 10 is located in a direction range of tilting to the right by 20 degrees to 40 degrees relative to the due backward direction from the left ear of the user, with a distance between the woofer and the left ear of the user being in a range of 280 mm to 320 mm.

Figure 7:
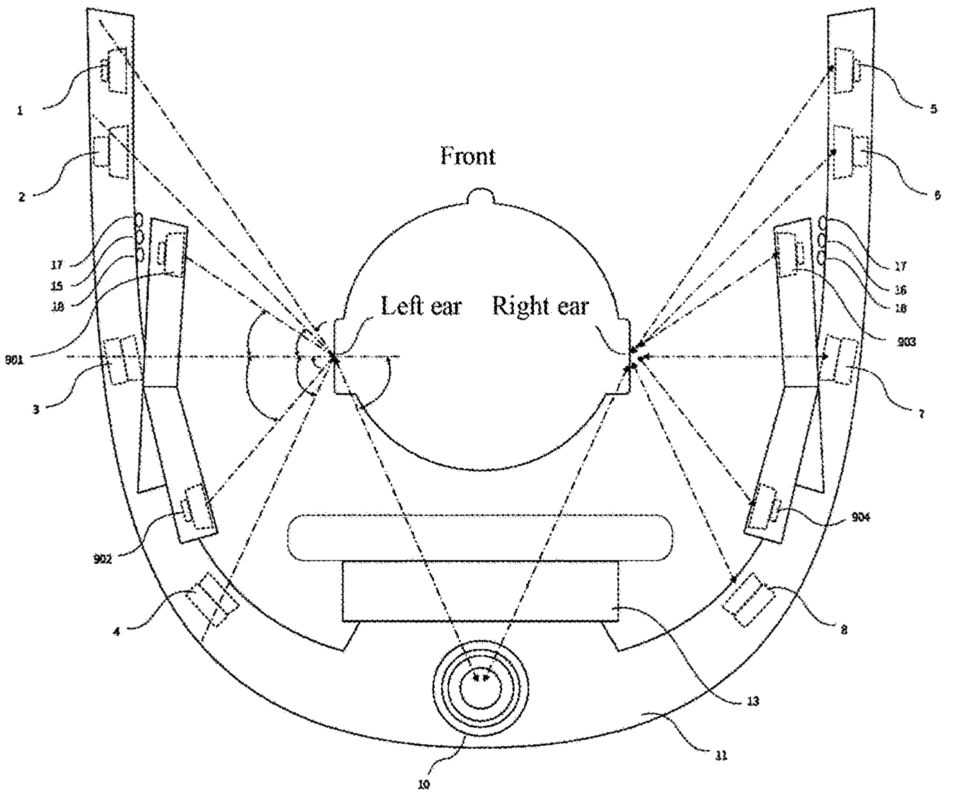
FIG. 7 is a top view of a multi-channel audio system using a 7.1.4 channel layout according to an embodiment of the present application.
Figure 8:
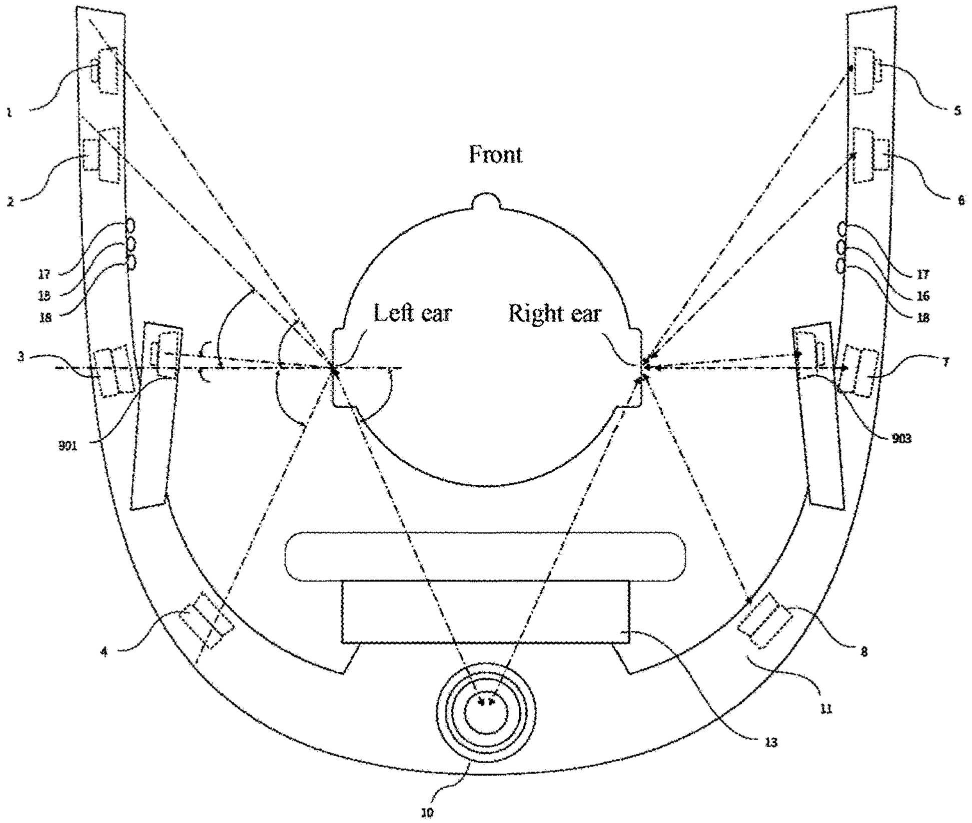
FIG. 8 is a top view of the multi-channel audio system using the 7.1.2 channel layout according to the embodiment of the present application.
Figure 9:
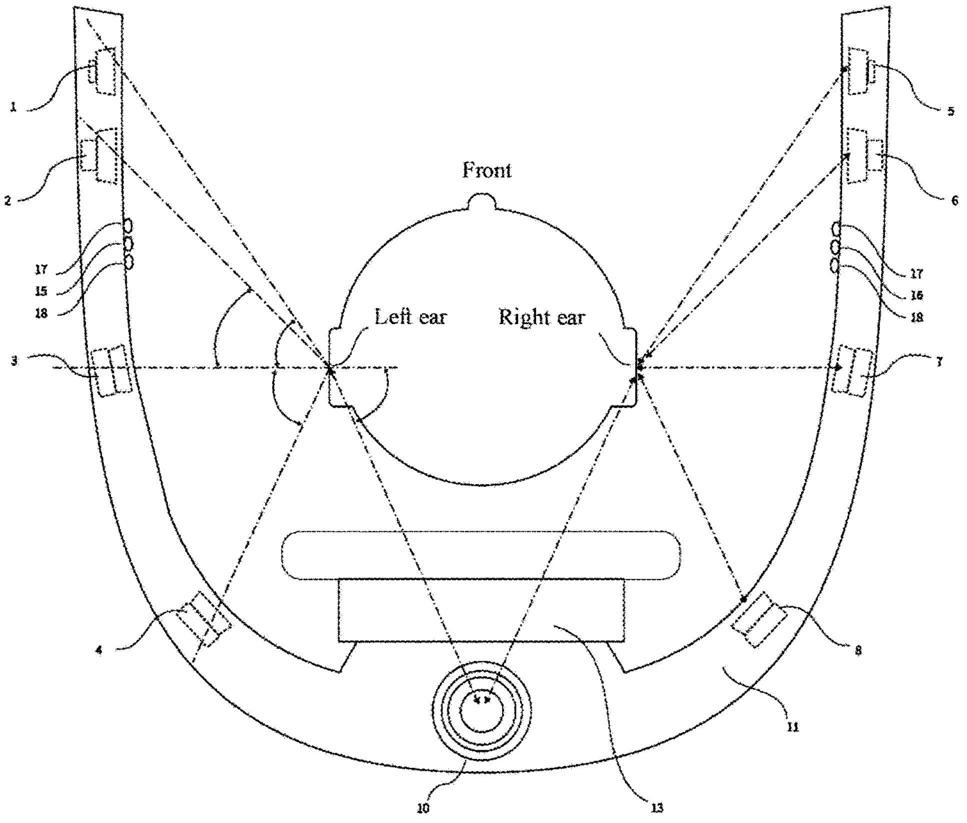
FIG. 9 is a top view of the multi-channel audio system using the 7.1 channel layout according to the embodiment of the present application.
Figure 10:
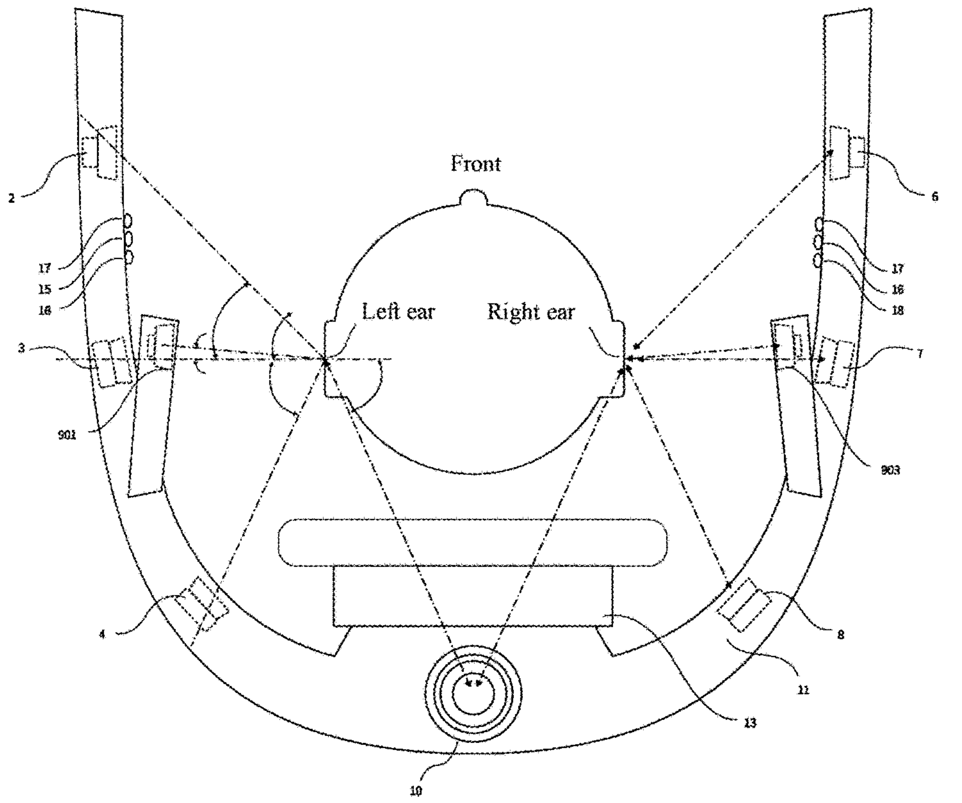
FIG. 10 is a top view of the multi-channel audio system using the 6.1.2 channel layout according to the embodiment of the present application.
Figure 11:
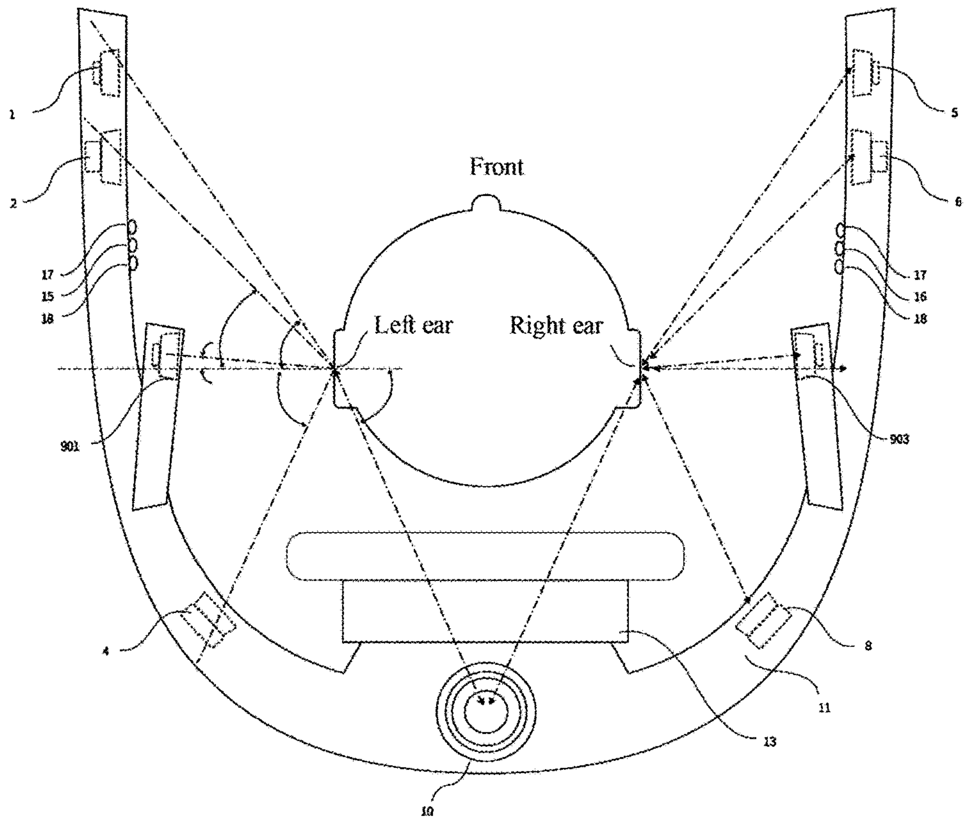
FIG. 11 is a top view of the multi-channel audio system using the 5.1.2 channel layout according to the embodiment of the present application.
Figure 12:
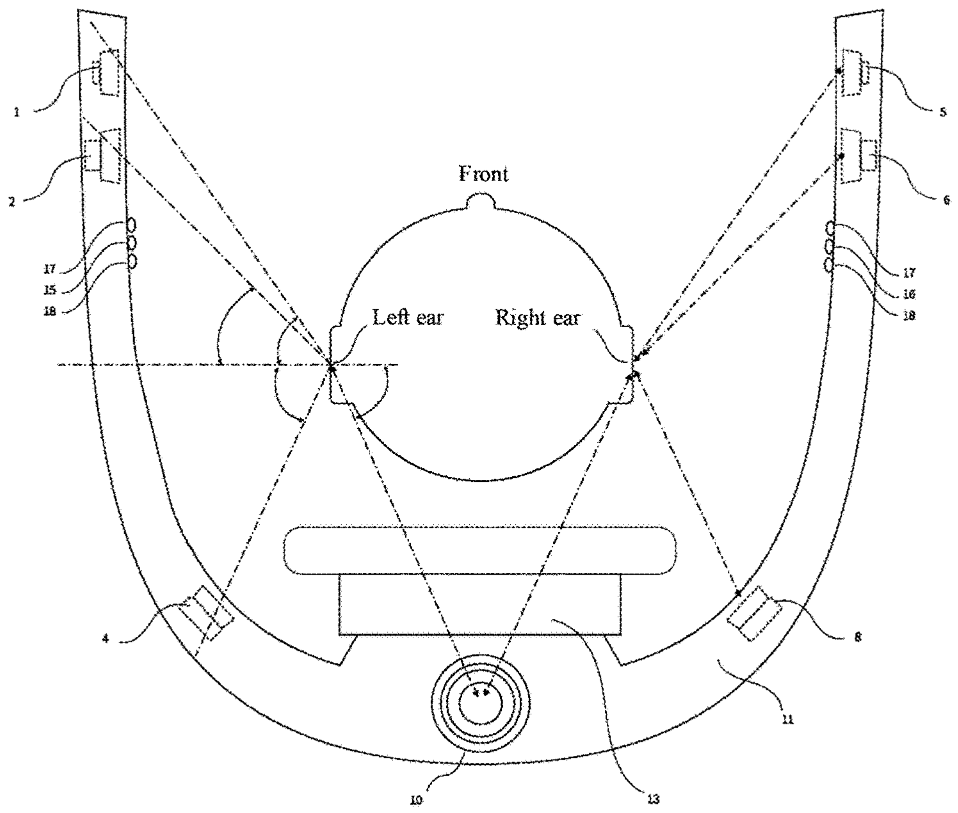
FIG. 12 is a top view of the multi-channel audio system using the 5.1 channel layout according to the embodiment of the present application.

Specifically, FIG. 7 is a top view of the multi-channel audio system using the 7.1.4 channel layout according to the embodiment of the present application, as shown in FIG. 7, when the head of the user is located in the center of the audio apparatus base 11, a plurality of speakers are arranged in the near field of the human ear of the user to form the 7.1.4 channel layout, and specific arrangement positions of the speakers of the 7.1.4 channel layout are determined based on the above-mentioned direction range and distance range. Both FIG. 7 and FIG. 1 use the 7.1.4 channel layout, and FIG. 7 is a top view of FIG. 1. FIG. 8 is a top view of the multi-channel audio system using the 7.1.2 channel layout according to the embodiment of the present application, and as shown in FIG. 8, specific arrangement positions of the speakers of the 7.1.2 channel layout are determined based on the above-mentioned direction range and distance range. Both FIG. 8 and FIG. 2 use the 7.1.2 channel layout, and FIG. 8 is a top view of FIG. 2. FIG. 9 is a top view of the multi-channel audio system using the 7.1 channel layout according to the embodiment of the present application, and as shown in FIG. 9, specific arrangement positions of the speakers of the 7.1 channel layout are determined based on the above-mentioned direction range and distance range. Both FIG. 9 and FIG. 3 use the 7.1 channel layout, and FIG. 9 is a top view of FIG. 3. FIG. 10 is a top view of the multi-channel audio system using the 6.1.2 channel layout according to the embodiment of the present application, and as shown in FIG. 10, specific arrangement positions of the speakers of the 6.1.2 channel layout are determined based on the above-mentioned direction range and distance range. Both FIG. 10 and FIG. 4 use the 6.1.2 channel layout, and FIG. 10 is a top view of FIG. 4. FIG. 11 is a top view of the multi-channel audio system using the 5.1.2 channel layout according to the embodiment of the present application, and as shown in FIG. 11, specific arrangement positions of the speakers of the 5.1.2 channel layout are determined based on the above-mentioned direction range and distance range. Both FIG. 11 and FIG. 5 use the 5.1.2 channel layout, and FIG. 11 is a top view of FIG. 5. FIG. 12 is a top view of the multi-channel audio system using the 5.1 channel layout according to the embodiment of the present application, and as shown in FIG. 12, specific arrangement positions of the speakers of the 5.1 channel layout are determined based on the above-mentioned direction range and distance range. Both FIG. 12 and FIG. 6 use the 5.1 channel layout, and FIG. 12 is a top view of FIG. 6. It needs to be noted that regardless of the channel layout, the speakers corresponding to the channel layout are determined in accordance with the above-mentioned direction range and distance range. A good stereo surround effect may be realized by precisely arranging the speakers of different channels in a specific angle range and distance range to form a stereo surround sound speaker system, thereby improving the user experience.

In some optional embodiments, the left centered-channel speaker 1 and the right centered-channel speaker 5, the left front channel speaker 2 and the right front channel speaker 6, the left front overhead channel speaker 901 and the right front overhead channel speaker 903, the left channel speaker 3 and the right channel speaker 7, the left rear overhead channel speaker 902 and the right rear overhead channel speaker 904, and the left rear channel speaker 4 and the right rear channel speaker 8 are symmetrically distributed relative to an axis of symmetry of the acoustic apparatus base 11.

Specifically, the plurality of speakers built in a right side of the audio apparatus base 11 and the plurality of speakers on a left side are symmetrically distributed relative to the axis of symmetry of the audio apparatus base 11. A perfect audio system is constructed through symmetrical design of a plurality of channels, which ensures that the left ear and the right ear of the user feel a consistent stereo surround effect.

In some optional embodiments, the mounting bracket 12 includes a seat mounting bracket 121, a floor mounting bracket 122, and a wall mounting bracket 123.

Specifically, referring to any one of FIG. 7 to FIG. 12, the audio apparatus base 11 is connected to the mounting bracket (not shown in FIG. 7 to FIG. 12) via a mounting plate 13, and the mounting plate 13 can be flexibly adjusted and disassembled to adapt to different mounting brackets 12. The embodiment of the present application is illustrated with the seat mounting bracket 121, the floor mounting bracket 122, and the wall mounting bracket 123 as examples, and the multi-channel audio system provided by the embodiment of the present application can be adaptively mounted in practical use. The multi-channel audio system can adapt to a wide range of different environments through specific categorization of the mounting bracket, which improves the flexibility of the system, meets the usage needs of the user under different conditions, and improves the user experience.

In some optional embodiments, when the audio apparatus base 11 is mounted on the seat mounting bracket 121, a mounting angle of the audio apparatus base 11 is within an angle range between 60 degrees upward relative to a horizontal direction and 20 degrees downward relative to the horizontal direction; when the audio apparatus base 11 is mounted on the floor mounting bracket 122, a mounting angle of the audio apparatus base 11 is within an angle range between 60 degrees upward relative to the horizontal direction and 90 degrees downward relative to the horizontal direction, and a vertical height of the floor mounting bracket 122 from the ground is in a height range of 1 meter to 1.9 meters; and when the audio apparatus base 11 is mounted on the wall mounting bracket 123, a mounting angle of the audio apparatus base 11 is within an angle range between 60 degrees upward relative to the horizontal direction and 90 degrees downward relative to the horizontal direction, and a vertical height of the wall mounting bracket 123 from the ground is in a height range of 1.3 meters to 1.9 meters.

Figure 13:
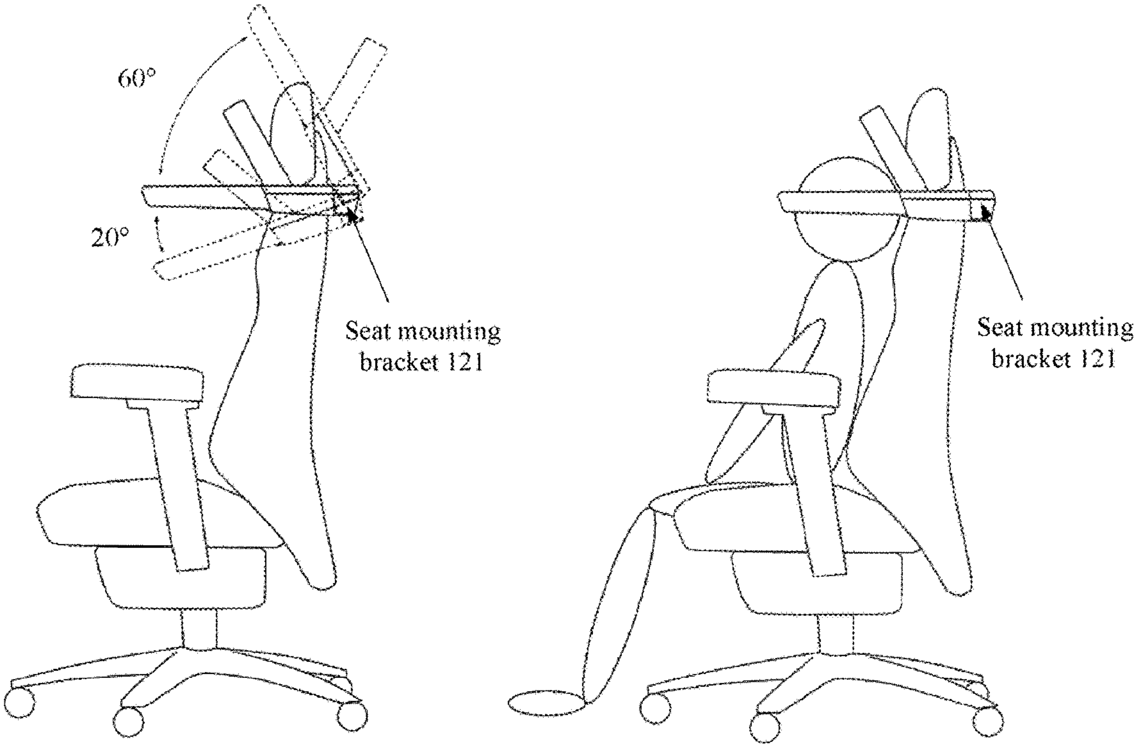
FIG. 13 is a schematic view of a seat mounting bracket according to an embodiment of the present application.
Figure 14:
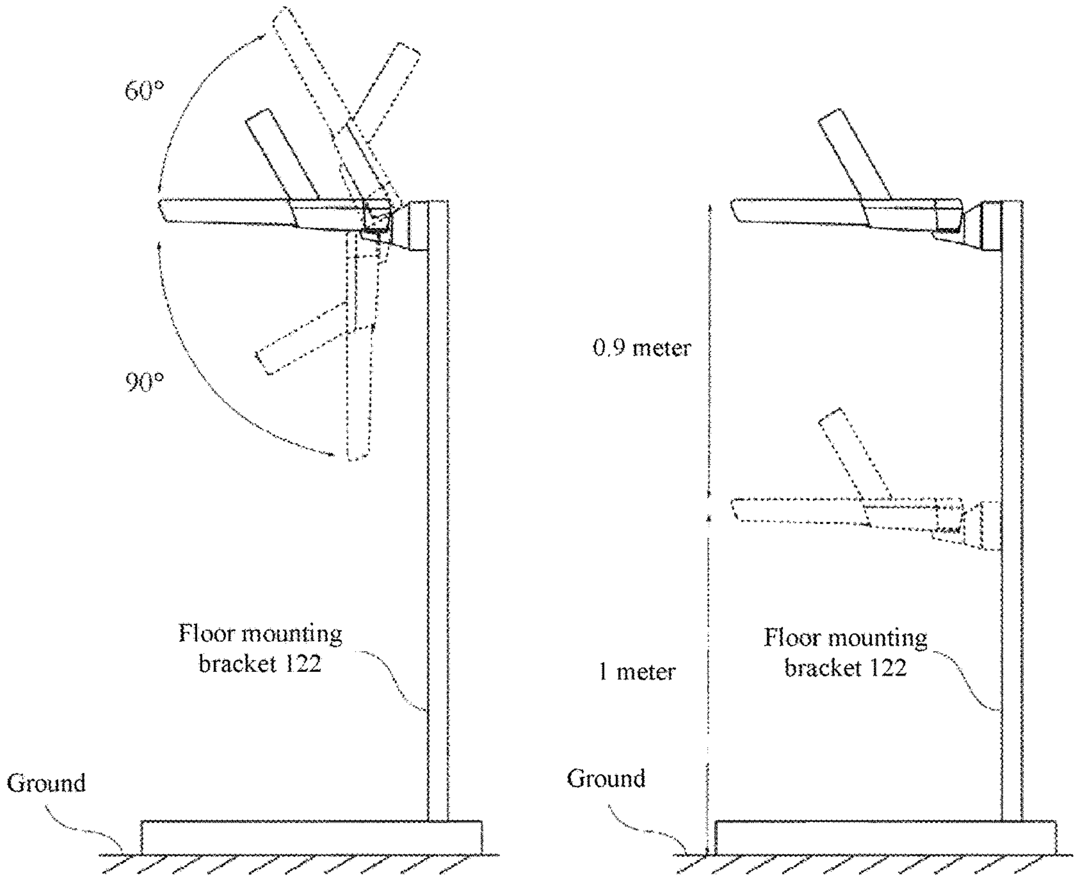
FIG. 14 is a schematic view for mounting a floor mounting bracket according to an embodiment of the present application.
Figure 15:
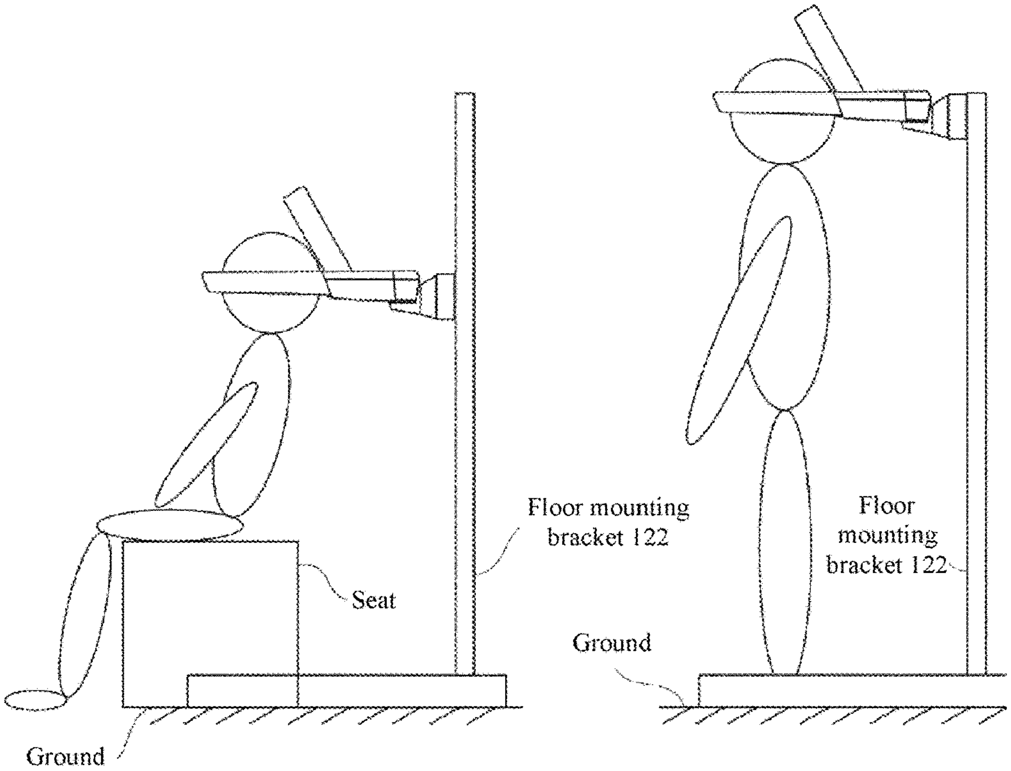
FIG. 15 is a schematic view for using the floor mounting bracket according to the embodiment of the present application.
Figure 16:
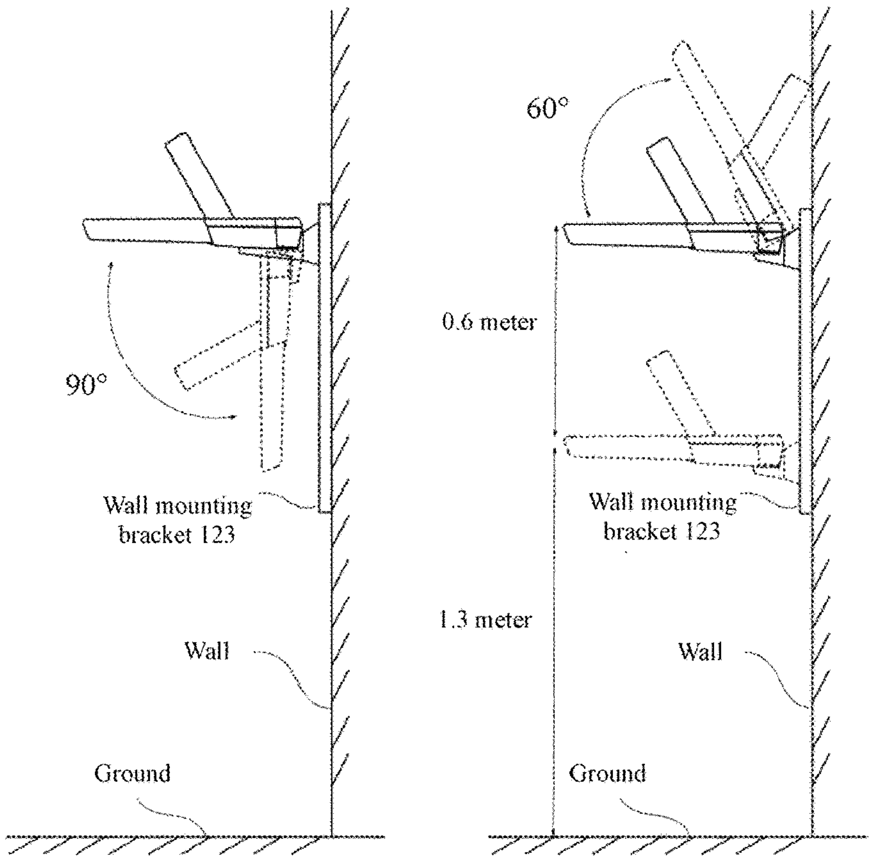
FIG. 16 is a schematic view for mounting a wall mounting bracket according to an embodiment of the present application.
Figure 17:
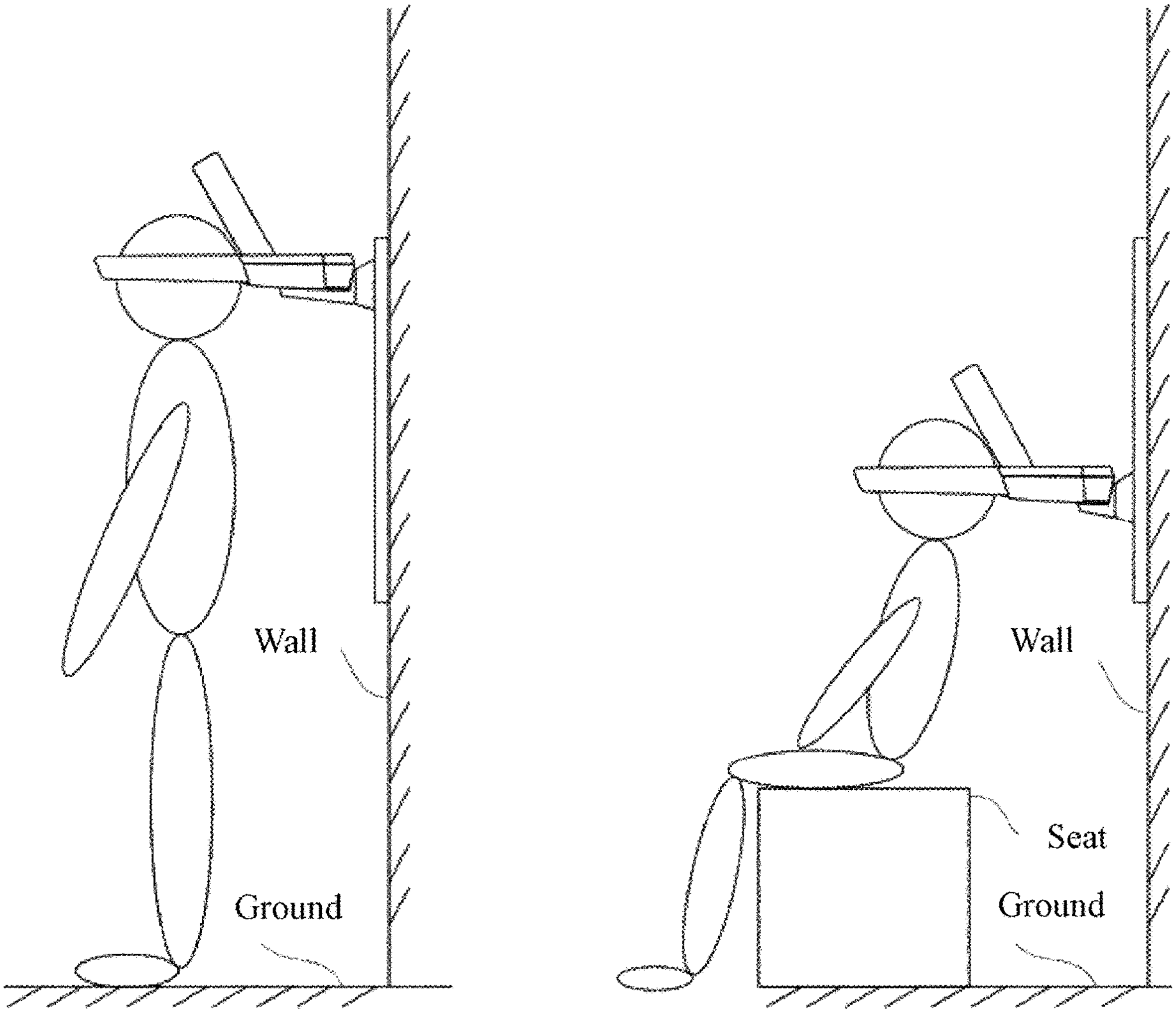
FIG. 17 is a schematic view for using the wall mounting bracket according to the embodiment of the present application.

Specifically, FIG. 13 is a schematic view of the seat mounting bracket according to an embodiment of the present application, as shown in FIG. 13, the seat mounting bracket 121 can be used to mount the multi-channel audio system on a seat, with the audio apparatus base 11 being adjusted in the angle range between 60°upward relative to the horizontal direction and 20°downward relative to the horizontal direction. FIG. 14 is a schematic view for mounting the floor mounting bracket according to an embodiment of the present application, and FIG. 15 is a schematic view for using the floor mounting bracket according to the embodiment of the present application. The floor mounting bracket 122 can be applied to a scenario where the user is located on a seat not facilitating mounting, such as a sofa, or is in a standing posture, and the audio apparatus base 11 is adjusted in the angle range between 60°upward relative to the horizontal direction and 90°downward relative to the horizontal direction, and the height of the floor mounting bracket 122 can be adjusted between 1 meter and 1.9 meters above the ground. FIG. 16 is a schematic view for mounting the wall mounting bracket according to an embodiment of the present application, and FIG. 17 is a schematic view for using the wall mounting bracket according to the embodiment of the present application. The wall mounting bracket 123 can be applied to a scenario where it is inconvenient to mount a seat, and the audio apparatus base 11 is adjusted in the angle range between 60°upward relative to the horizontal direction and 90°downward relative to the horizontal direction, and the height of the wall mounting bracket 123 can be adjusted between 1.3 meters and 1.9 meters above the ground. With the three different mounting brackets 12, it is possible to adapt to the height and sitting posture of different users, and at the same time, by adjusting the mounting angle of the audio apparatus base 11 and the mounting height of the mounting bracket 12, it is possible to make the angle and distance between the ears of the user and the speakers of the system more appropriate, thereby obtaining a good stereo surround effect, such that the user experience can be improved.

In some optional embodiments, the audio apparatus base 11 further includes a centered-channel forward-sound-guide output hole 14, a connection mode switching button 15, a power button 16, a volume increase button 17, and a volume decrease button 18.

Specifically, referring to any one of FIG. 1 to FIG. 6 except FIG. 4, by designing the centered-channel forward-sound-guide output hole 14, the left and right front speakers can guide a position of sound of a centered-channel to the right front, so as to achieve the effect of the centered-channel right in the front. Since the centered-channel forward-sound-guide output hole 14 and the right centered-channel speaker 5 are jointly controlled, the right centered-channel speaker 5 is closed in the 6.1.2 channel layout adopted in FIG. 4, and thus the centered-channel forward-sound-guide output hole 14 is also closed, and neither the centered-channel forward-sound-guide output hole 14 nor the right centered-channel speaker 5 is illustrated in FIG. 4. Referring to any one of FIG. 7 to FIG. 12, the connection mode switching button 15 may be switched among multiple connection modes, such as High-Definition Multimedia Interface Input (HDMI in), Enhanced Audio Return Channel over HDMI (HDMI eARC), wireless Bluetooth, and a 3.5 mm audio interface. By means of the power button 16, the audio apparatus base 11 can be controlled to be turned on and off, and the speakers included in the audio apparatus base 11 can also be independently controlled to be turned on and off. The volume of the surround sound can be adjusted through the volume increase button 17 and the volume decrease button 18. By means of the plurality of buttons of the audio apparatus base 11, a plurality of needs of the user can be satisfied, which improves the practicability of the system and improves the user experience of the user.

The realistic stereo surround sound environment is created by covering the speakers in multiple directions, and the audio plug of the overhead channel module is connected to the audio apparatus base, thereby ensuring the stability of signal transmission. Meanwhile, due to combined design of the audio apparatus base and the mounting bracket, flexible adjustment can be performed according to an actual environment. Compared with the related art in which a user wears headphones that simulate a stereophonic effect, the stereo surround effect and user experience are improved.

Although the embodiments of the present application are described with reference to the accompanying drawings, those skilled in the art may make various modifications and variations without departing from the spirit and scope of the present application, and such modifications and variations all fall within the scope limited by the appended claims.

The embodiments of the invention in which an exclusive property or privilege is claimed are defined as follows:

1. A multi-channel audio system, wherein the system comprises a left centered-channel speaker, a left front channel speaker, a left channel speaker, a left rear channel speaker, a right centered-channel speaker, a right front channel speaker, a right channel speaker, a right rear channel speaker, a overhead channel module, a woofer, an audio apparatus base, and a mounting bracket, the overhead channel module comprises an audio plug, the audio apparatus base comprises an audio socket, and the mounting bracket comprises a mounting plate;

the left centered-channel speaker, the left front channel speaker, the left channel speaker, the left rear channel speaker, the right centered-channel speaker, the right front channel speaker, the right channel speaker, the right rear channel speaker, and the woofer are all built in the audio apparatus base;

the overhead channel module is located above the audio apparatus base and is connected to the audio socket of the audio apparatus base through the audio plug; and the audio apparatus base is mounted on the mounting bracket through the mounting plate.

2. The system according to claim 1, wherein the overhead channel module further comprises a left front overhead channel speaker, a left rear overhead channel speaker, a right front overhead channel speaker, and a right rear overhead channel speaker, and the left front overhead channel speaker, the left rear overhead channel speaker, the right front overhead channel speaker, and the right rear overhead channel speaker are all built in the overhead channel module.

3. The system according to claim 2, wherein the overhead channel module is detachable, and the left front overhead channel speaker, the left rear overhead channel speaker, the right front overhead channel speaker, and the right rear overhead channel speaker in the overhead channel module are all detachable.

4. The system according to claim 3, wherein, when the head of a user is located at a center position of the audio apparatus base, the left centered-channel speaker is located in a direction range of tilting to the left by 15 degrees to 35 degrees relative to a due front direction from the left ear of the user, with a distance between the left centered-channel speaker and the left ear of the user being in a range of 270 mm to 300 mm;

the left front channel speaker is located in a direction range of tilting to the left by 40 degrees to 60 degrees relative to the due front direction from the left ear of the user, with a distance between the left front channel speaker and the left ear of the user being in a range of 220 mm to 240 mm;

the left front overhead channel speaker is located in a direction range of tilting to the left by 30 degrees to 60 degrees relative to the due front direction from the left ear of the user, with a distance between the left front overhead channel speaker and the left ear of the user being in a range of 240 mm to 300 mm;

the left channel speaker is located in a direction range of between tilting forwards by 15 degrees and tilting backwards by 15 degrees relative to a due left direction from the left ear of the user, with a distance between the left channel speaker and the left ear of the user being in a range of 150 mm to 170 mm;

the left rear overhead channel speaker is located in a direction range of tilting to the left by 30 degrees to 60 degrees relative to a due backward direction from the left ear of the user, with a distance between the left rear overhead channel speaker and the left ear of the user being in a range of 240 mm to 300 mm;

the left rear channel speaker is located in a direction range of tilting to the left by 20 degrees to 40 degrees relative to the due backward direction from the left ear of the user, with a distance between the left rear channel speaker and the left ear of the user being in a range of 180 mm to 220 mm; and the woofer is located in a direction range of tilting to the right by 20 degrees to 40 degrees relative to the due backward direction from the left ear of the user, with a distance between the woofer and the left ear of the user being in a range of 280 mm to 320 mm.

5. The system according to claim 4, wherein the left centered-channel speaker and the right centered-channel speaker, the left front channel speaker and the right front channel speaker, the left front overhead channel speaker and the right front overhead channel speaker, the left channel speaker and the right channel speaker, the left rear overhead channel speaker and the right rear overhead channel speaker, and the left rear channel speaker and the right rear channel speaker are symmetrically distributed relative to an axis of symmetry of the acoustic apparatus base, respectively.

6. The system according to claim 1, wherein the mounting bracket comprises a seat mounting bracket, a floor mounting bracket and a wall mounting bracket.

7. The system according to claim 6, wherein, when the audio apparatus base is mounted on the seat mounting bracket, a mounting angle of the audio apparatus base is within an angle range between 60 degrees upward relative to a horizontal direction and 20 degrees downward relative to the horizontal direction;

when the audio apparatus base is mounted on the floor mounting bracket, a mounting angle of the audio apparatus base is within an angle range between 60 degrees upward relative to the horizontal direction and 90 degrees downward relative to the horizontal direction, and a vertical height of the floor mounting bracket from the ground is in a height range of 1 meter to 1.9 meters; and when the audio apparatus base is mounted on the wall mounting bracket, a mounting angle of the audio apparatus base is within an angle range between 60 degrees upward relative to the horizontal direction and 90 degrees downward relative to the horizontal direction, and a vertical height of the wall mounting bracket from the ground is in a height range of 1.3 meters to 1.9 meters.

8. The system according to claim 1, wherein the audio apparatus base further comprises a centered-channel forward-sound-guide output hole, a connection mode switching button, a power button, a volume up button, and a volume down button.

* * * * *